(12) United States Patent
So (10) Patent No.: US 7,126,475 B2
(45) Date of Patent: Oct. 24, 2006

(54) ELECTRONIC FENCE TRANSMITTER FOR SELF-ADJUSTING THE RECEIVING DISTANCE

(76) Inventor: Ho Yun So, 8-1006 Kwangjang Apt., 28 Youido-dong, Yongdungpo-gu, Seoul 150-762 (KR)

( * ) Notice: Subject to any disclaimer, the term of this patent is extended or adjusted under 35 U.S.C. 154(b) by 191 days.

(21) Appl. No.: 10/920,677

(22) Filed: Aug. 17, 2004

(65) Prior Publication Data

US 2006/0037560 A1    Feb. 23, 2006

(51) Int. Cl.
G08B 13/26  (2006.01)

(52) U.S. Cl. .................. 340/564; 340/561; 340/573.3; 340/657; 119/720; 119/908

(58) Field of Classification Search .............. 340/564, 340/573.1, 541, 561, 573.3, 565, 660, 657, 340/664, 552, 635, 649; 119/720, 721, 908; 119/712; 256/1, 11, 12
See application file for complete search history.

(56) References Cited

U.S. PATENT DOCUMENTS

| 5,121,711 | A | | 6/1992 | Aine ........................... 119/29 |
|---|---|---|---|---|
| 5,381,129 | A | | 1/1995 | Boardman .................. 340/573 |
| 5,408,956 | A | | 4/1995 | Quigley ...................... 119/720 |
| 5,682,839 | A | * | 11/1997 | Grimsley et al. ........... 119/721 |
| 5,781,113 | A | | 7/1998 | Yarnall, Sr. et al. ........ 340/573 |
| 5,808,551 | A | * | 9/1998 | Yarnall et al. ........... 340/573.4 |
| 5,844,489 | A | | 12/1998 | Yarnall, Jr. et al. ......... 340/573 |
| 5,967,094 | A | * | 10/1999 | Grimsley et al. ........... 119/721 |
| D417,835 | S | | 12/1999 | Williams ..................... D8/356 |
| 6,043,748 | A | | 3/2000 | Touchton et al. ........ 340/573.3 |
| 6,184,790 | B1 | | 2/2001 | Gerig ...................... 340/573.3 |
| 6,459,378 | B1 | | 10/2002 | Gerig ...................... 340/573.3 |
| 2001/0030610 | A1 | | 10/2001 | Rochelle et al. |
| 2002/0073933 | A1 | | 6/2002 | Oakman |

* cited by examiner

Primary Examiner—Thomas Mullen
Assistant Examiner—Daniel Previl
(74) Attorney, Agent, or Firm—Sheridan Ross P.C.

(57) ABSTRACT

An electronic fence transmitter for self-adjusting the receiving distance is comprised of a fence wire buried in a yard, a voltage detector that is connected in series to the fence wire and a comparator for comparing the detected voltage of the voltage detector with a reference voltage. A voltage applied to the fence wire is automatically adjusted according to a signal inputted from the comparator and increasing gradually until a value of the detected voltage is larger than the value of the reference voltage. Accordingly, a distance for receiving the signal from the fence wire is set as constant without regard to an installation length or area of fence wire.

6 Claims, 11 Drawing Sheets

ELECTRONIC FENCE TRANSMITTER FOR SELF-ADJUSTING THE RECEIVING DISTANCE

BACKGROUND OF THE INVENTION

1. Field of the Invention

The current invention was developed in relation to the concept of an electronic fence transmitter with an adjustable transmitting or receiving distance which incorporates a fence wire, installed along a boundary of confinement. This confinement area is used to restrict a pet's activity, limiting it to being within the selected boundaries. A voltage is applied to the fence wire and is automatically changed accordingly with respects to the length of the fence wire. The emitted radio signals from the fence wire to the receiver can also be maintained at a constant level over the entire distance covered by the boundary.

2. Description of the Prior Art

In the past, this method has been used to confine a pet within a controllable boundary. A fence wire is installed surrounding the area in which a pet's activity can be confined and a signal is emitted from the fence wire. The receiver is attached to the pet that generates a shock when the pet approaches within a certain range of the fence wire.

Figure 1:
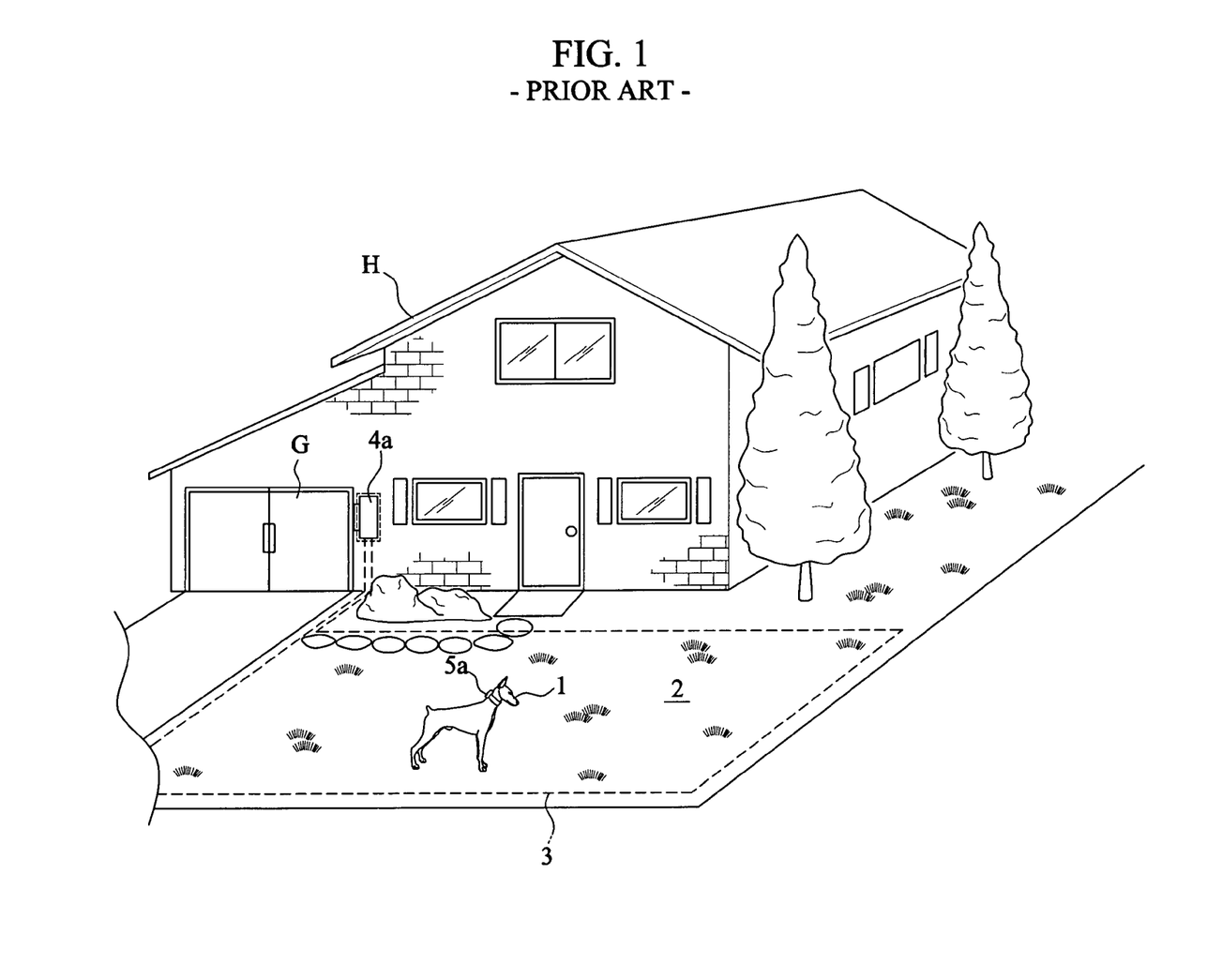
FIG. 1 is a view illustrating the pet confinement system using a wire in accordance with the prior art.

An example of such a method in which a wire is installed for sending a signal is disclosed in U.S. Pat. No. 5,967,094. FIG. 1 illustrates the pet confinement system using a wire in accordance with the prior art.

A front yard or garden of a house 'H' has a confined area 2, in which a pet may move about freely. A loop of wire represented by a dashed line 3, is buried in the yard along the boundary of this confined area.

The loop of wire 3 is electrically connected to a transmitter 4a, is placed inside the garage 'G' of the house. This transmitter 4a generates RF boundary signals that are radiated through the buried loop of wire 3. As a pet approaches the wire within a predetermined range, a receiver 5a, attached to the pet 1, detects the boundary signal radiated from the wire 3.

When the receiver 5a receives the boundary signal radiated from the wire 3, a shock is applied to the pet 1 in order to prevent the pet from escaping from the confined area.

Furthermore, the transmitter 4a has a protective circuitry at the wire 3 that enables it to be protected from a surge of energy or shock, such as from lightening.

The transmitter, using the conventional fence wire installation method, adjusts the intensity of radio signals emitted from the fence wire. The receiver can receive a signal within a boundary width from the fence wire (ex. 5 meters inwards and 5 meters outwards from the fence wire). If the length of the fence wire is too long, the intensity of the radio signal is decreased due to a resistance in the fence wire. Therefore, the boundary should not be made too large or too small in order to accommodate the pet's activity, while having adequate strength and coverage of the emitting RF signals.

In other words, since the intensity of the signal that is applied to the fence wire from the transmitter has a continuously constant level, the intensity of the signal could be weakened by a resistance in the fence wire that is proportional to the length of the fence wire.

A resistance applied to the wire can be equivalent to a resistor $R_0$, where this value is proportional to a length of the fence wire. For example, when a length of the fence wire using #18 AWG (America Wire Gauge) is 6,000 ft, the equivalent resistance is approximately 41.7Ω. When 4,000 ft of the same wire is used, the resistance becomes 27.8Ω, and finally when 2,000 ft is used, the resistance is approximately 13.9Ω.

Therefore, as the length of the fence wire increases, the area of the pet's activity can increase. However, the increase in the length increases the resistance in the fence wire and thus decreasing the intensity of the emitted radio signal to the intended receiver. The variation in receiving distance occurs at the boundary limits causing poor operation. This poses a problem that a pet's activity can't be controlled within this limited boundary.

Figure 2:
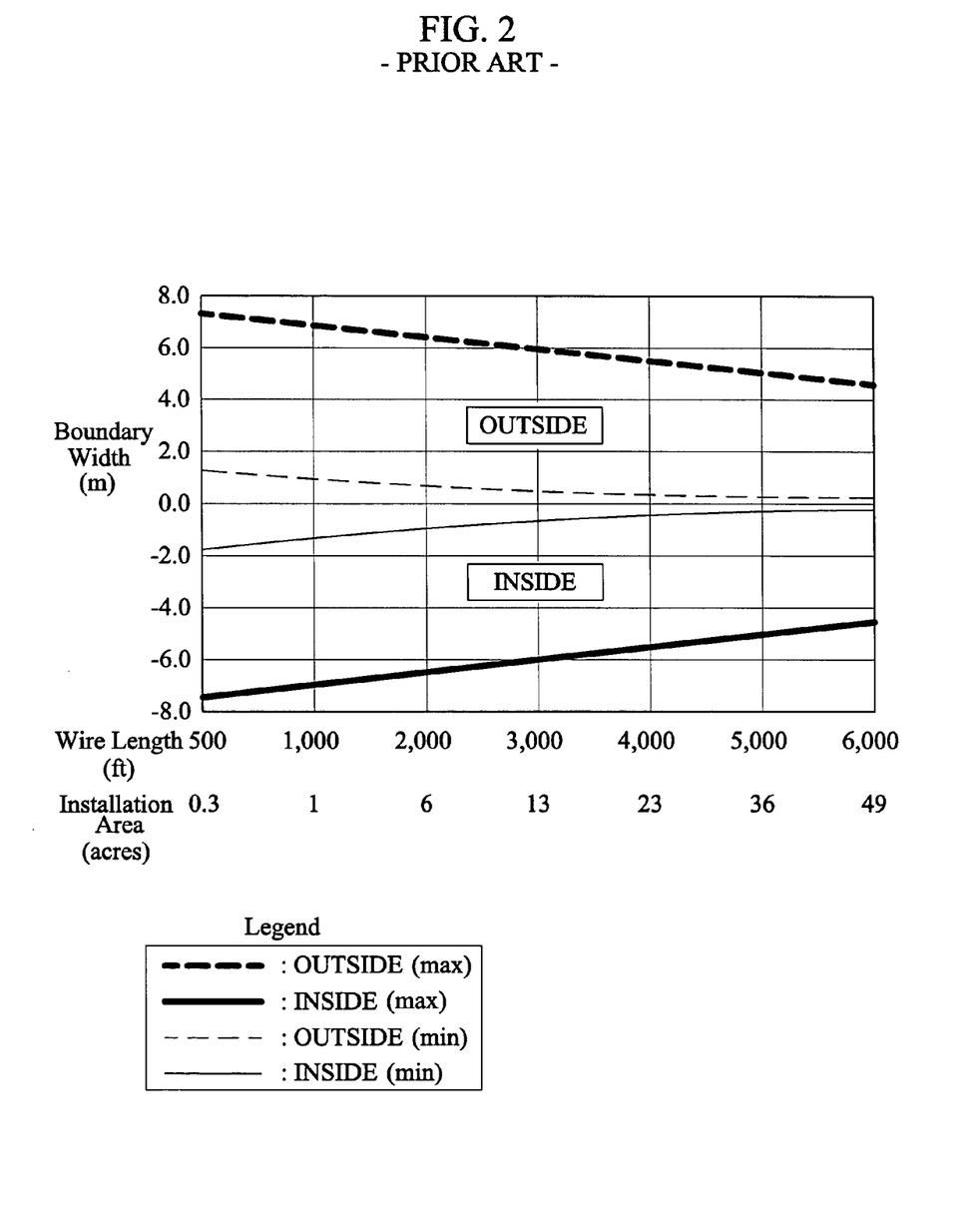
FIG. 2 is a graph that depicts the distances for receiving a radio signal along the installed length of fence wire while the transmitter is applying a radio signal to the #18 AWG fence wire according to the prior art.

FIG. 2 is a graph that depicts the distances for receiving a radio signal along the installed length of fence wire while the transmitter is applying a radio signal to the #18 AWG fence wire according to the prior art.

Herein, the dotted lines indicate the receiving distance from the inside of the fence wire and the solid lines represent the receiving distance from the outside of the fence wire. The bold, dotted and solid lines represent the receiving distances at each direction when a maximum voltage is applied to the fence wire while the fine dotted and solid lines are the receiving distances at each direction when a minimum voltage is applied to the fence wire.

As the conventional transmitter cannot automatically control the voltage applied to a fence wire, a voltage of 12V is applied to the fence wire up to 2,000 ft of an installation length. A voltage of 24V is applied to the fence wire above 2,000 ft of the installation length. The graph illustrates a result that measures a sensing distance for a radio signal emitted from a fence wire by the conventional receiver.

When an installation length of the fence wire is 4,000 ft, a pet approaches the fence wire within approximately 6 meters from an inward direction or an outward direction from the wire so that the receiver can receive a radio signal emitted from the fence wire. When this length of fence wire is 5,000 ft, the approaching distance is about 5 meters in each direction from the fence wire. When the installation length is 6,000 ft, the active distance range is about 4.3 meters in an inward direction or about 4 meters in an outward direction.

Figure 3:
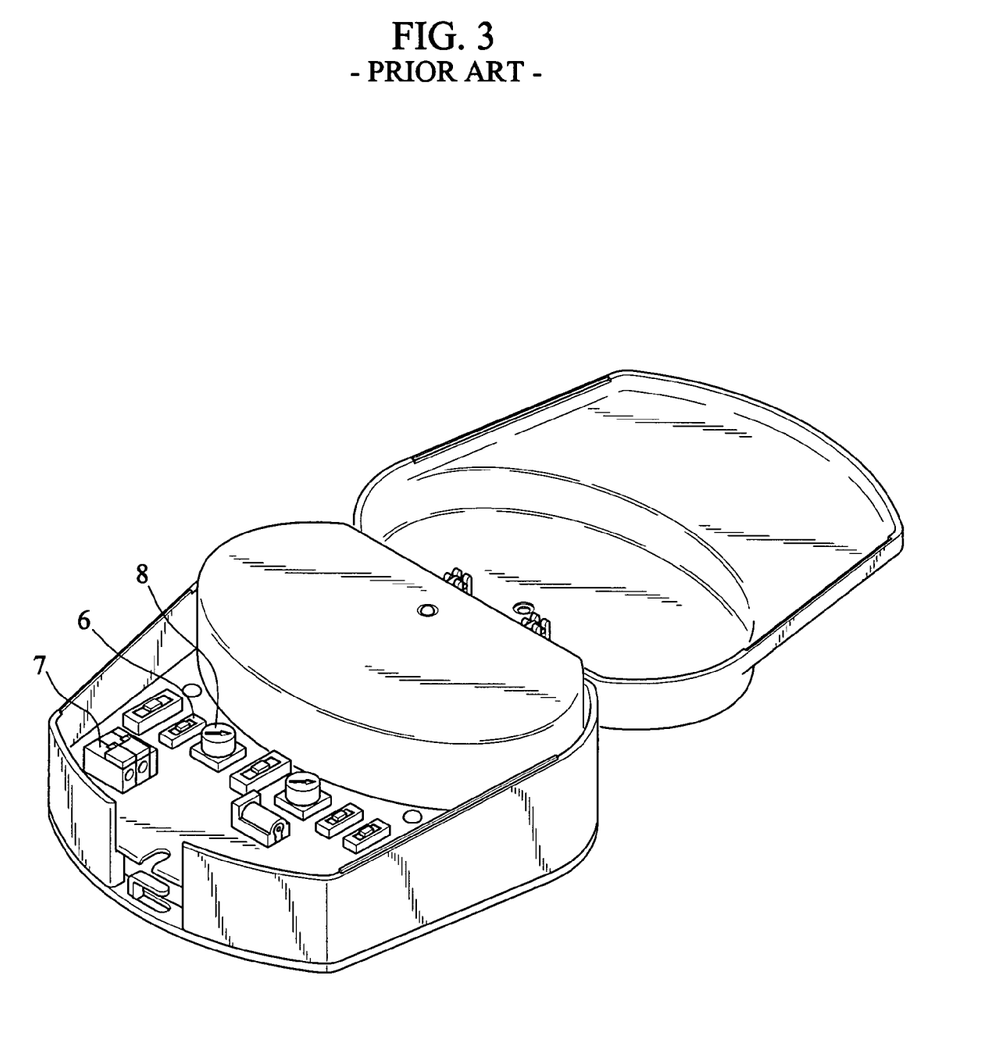
FIG. 3 is a perspective view of the transmitter of the fence wire according to the prior art.

Illustrated in FIG. 3 above, is the conventional transmitter to solve this problem that the distance (or boundary width) for receiving a radio signal must vary according to an installation length of fence wire. Provided on the panel of the transmitter are an area selection switch 6, a wire connector 7, and a variable resistor 8. The variable resistor 8 can adjust the applied voltage according to the length of the fence wire. The area selection switch 6 can select a wide point or a narrow point according to an area of a restricted domain. The wire connector 7 can be connected with either thick or thin wire according to a length of the fence wire. The variable resistor 8 can adjust the applied voltage according to a length of the fence wire.

In the conventional transmitter, the area selection switch 6 can be controlled depending on a wide or a narrow area according to the area of the restricted domain so as to adjust the voltage applied to the fence wire. But, only two levels of the voltage can be selected (ex. high or low voltage), and it cannot overcome problems that the receiving boundary width has to be changed according to the length of the fence wire as shown in FIG. 2.

Also, both thick and thin wires are prepared, and the proper sized wire is connected to the wire connector 7 depending on the installation length of the fence wire.

However, it also cannot overcome problems that the receiving boundary width has to be changed according to the length of the fence wire as shown in FIG. 2.

Furthermore, adjusting the variable resistor 8 can change the voltage applied to the fence wire. After adjusting the variable voltage, a user has to check along the fence wire with a hand-on receiver to confirm its operation. If the check is improper, the adjustment should be re-established, which can lead to problems.

As well, a user must learn a device control method for the transmitter to change an installation distance of the fence wire and a voltage to be applied to the fence wire, which poses a burden on a user.

SUMMARY OF THE INVENTION

Therefore, the present invention is designed to solve these problems and issues. One object of the present invention is an electronic fence transmitter for self-adjusting the receiving distance, whereby a voltage applied to a fence wire can be automatically adjusted according to an installation length of the fence wire so as to restrict a pet's activity in a predetermined area. A distance for receiving the signal from the fence wire is set as constant without regard to an installation length or area of fence wire.

An objective of the present invention is an electronic fence transmitter for self-adjusting the receiving distance, in which the applied voltage can be automatically adjusted, so that the previous problems of a user manually adjusting the applied voltage and replacing the wire according to the applied voltage, can now be avoided.

Another objective is an electronic fence transmitter for self-adjusting the receiving distance, in which a voltage detecting resistor is connected in series with one end of the fence wire. Then the voltage that is generated at the voltage detecting resistor is compared with a reference voltage. The generated voltage is then made equal to the value of the reference voltage, and thus, the value of the voltage applied to the fence wire is automatically adjusted.

The present invention will use an electronic transmitter for self-adjusting the receiving distance. Since the signal emitted from the fence wire is received within a predetermined distance from the fence wire without regard to an installation length or area of the fence wire, a pet's activity can be restricted even in an enlarged area.

It is made clear that a term "reference voltage" $V_{ref}$ described hereafter is a voltage that is applied to the voltage detecting resistor when the distance that receives radio signals is a predetermined distance from a boundary. A fence wire having a predetermined length is installed along the boundary.

In order to accomplish those and these objects, it has characteristic in that the present invention is comprised of:

a fence wire buried in a yard along the boundary of a confined area within which a pet may move around freely;

a digital-analog (D/A) converter for gradually increasing the voltage applied to the fence wire;

a wire voltage amplifier for amplifying voltage outputted from the D/A converter and for applying to the fence wire;

a data amplifier for amplifying data signal that is applied to the fence wire from a controller;

a power amplifier for power-amplifying a data signal that is outputted from the data amplifier;

a voltage detector that is connected in series to the fence wire;

a comparator for comparing the detected voltage of the voltage detector with a reference voltage; and a controller by which the D/A converter is controlled according to a signal inputted from the comparator and a voltage applied to the fence wire increasing gradually until a value of the detected voltage is larger than the value of the reference voltage.

Furthermore, it has another characteristic in that the signal applied to the fence wire from the transmitter controller is amplitude-modulated with a 10 kHz signal.

Furthermore, it has another characteristic in that the power amplifier consists of a field-effect transistor.

Furthermore, it has another characteristic in that the voltage detector is comprised of a resistor, one end of which is connected to the power amplifier, another end of which is connected to a ground, and the resistor is connected to the fence wire so as to divide the voltage according to the ON operation of the power amplifier.

Furthermore, it has another characteristic in that when radio signal emitted from the fence wire having the predetermined length is received at the predetermined distance far from the fence wire, the voltage applied to the resistor of the voltage detector is measured and, the measured voltage is established as the reference voltage of the comparator.

Furthermore, it has another characteristic in that a variable resistor and an analog switch are connected between the D/A converter and the wire voltage amplifier so as to manually vary the voltage that is applied to the fence wire.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

In the following description, references should now be made to the drawings in which the same reference numbers are used throughout the different drawings to designate the same or similar components.

Figure 4:
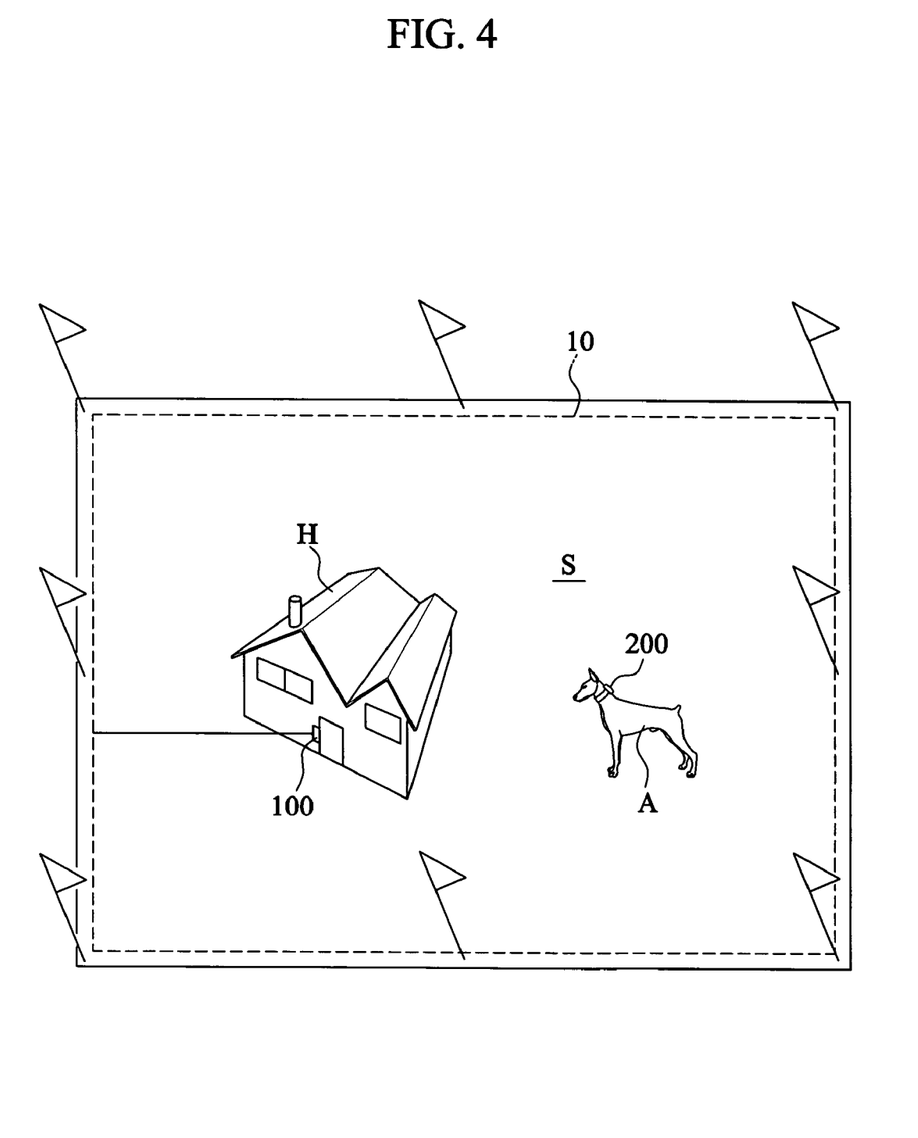
FIG. 4 is an installation view of an electronic fence having its transmitter according to the present invention.

FIG. 4 is an installation view of an electronic fence having its transmitter according to the present invention.

In one embodiment, the electronic fence 10 is buried in the yard along the boundary of a confined area 'S' within which a pet 'A' may move around freely.

The transmitter 100 is installed inside the house 'H', on a wall of a living room for example, and is connected to each end of the fence wire 10. One end of the fence wire 10 is electrically connected to the positive (+) power terminal (ex. DC 25V ), and the other end is electrically connected to LOOP-DET terminal of the transmitter 100 which can check a loop voltage so as to sense any breakage in the wire.

Therefore, the fence wire 10 is installed along the boundary of a confined area 'S' and electricity is applied to the wire. That forms an electric loop along the boundary of the confined area 'S'.

The transmitter 100 applies a boundary indicating signal to the fence wire 10 and if a pet 'A' that moves around in the fence wire approaches to the fence wire within a predetermined distance (ex. receiving distance), the receiver 200 attached on the pet 'A' receives the boundary indicating radio signal emitted from the fence wire. A shock voltage is generated in the receiver and an electric shock is given to the pet 'A'.

The boundary indicating signal includes a shock level signal with respects to the mode selection. Either electrical shock only or a combination of electrical shock and vibration (or vibration accompanied by sound) can be selected. In addition, the shock level can be changed so that the level can be adjusted according to the type of pet 'A'.

The fence wire 10 is buried along the boundary of a confined area 'S' in the yard of the house 'H' and it is connected to the transmitter 100 that is provided inside the house 'H'. The receiver 200 is attached to the body (ex. the neck) of the pet by a collar.

Figure 5A:
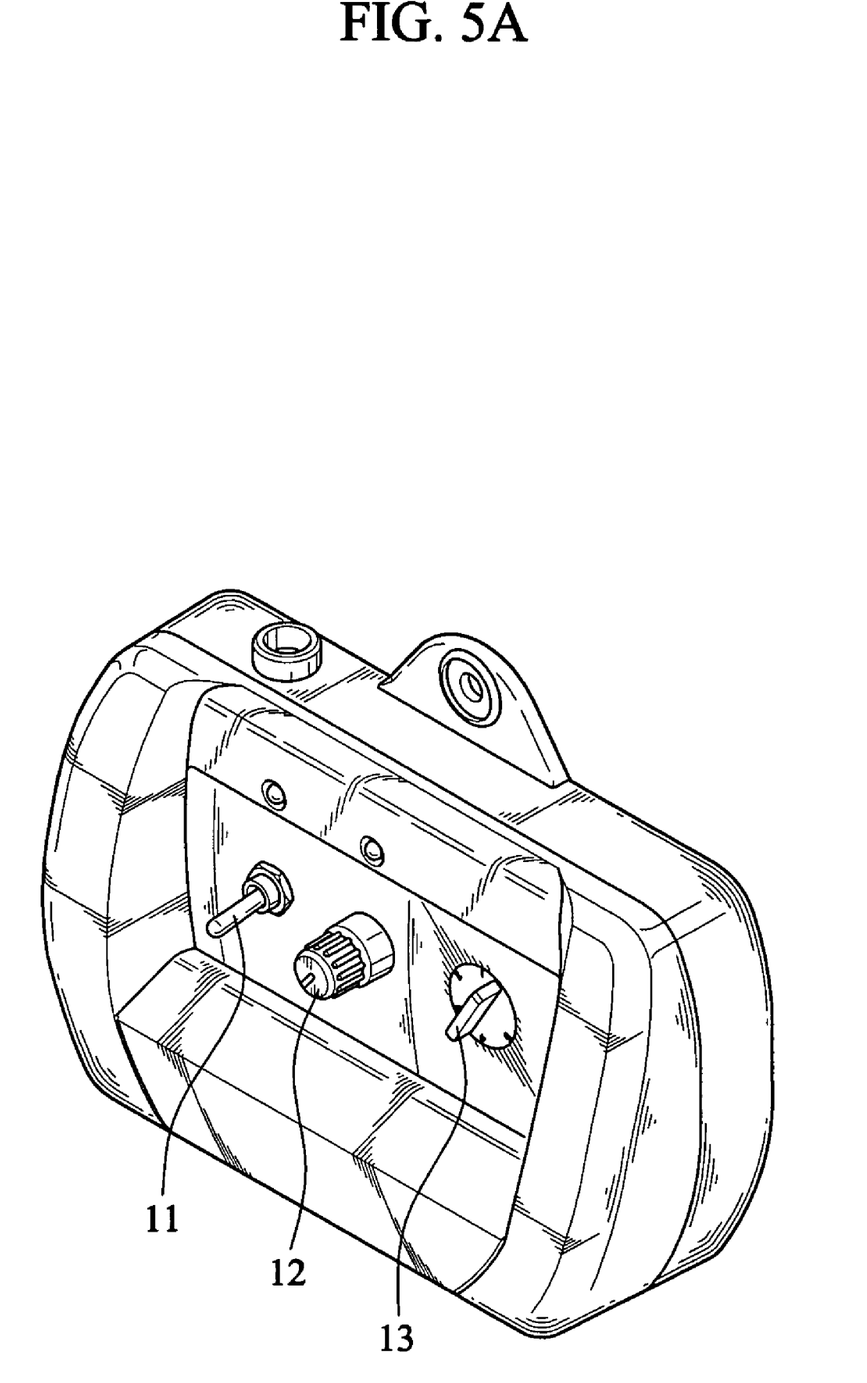
FIG. 5A is a perspective view of the transmitter of the fence wire according to the present invention.

FIG. 5A is a perspective view of the transmitter of the fence wire according to the present invention.

On the control panel of the transmitter of the fence wire provide a function selection switch 11, a receiving distance adjustment switch 12, a shock level selection switch 13 and a fence wire connector which is installed on the bottom of the case (not shown). A microprocessor that adjusts automatically the applied voltage is built in the transmitter that needs no switch for selecting high or low voltage. Owing to an operation of the built-in microprocessor, the applied voltage is automatically adjusted according to the length of the fence wire that maintains a constant receiving distance (ex. 5 meters perpendicular from the fence wire). More accurate receiving distances (ex. 3 meters perpendicular from the fence wire) can be attained by the receiving distance adjustment switch 12. Furthermore, a control panel of the transmitter has a simple configuration which is convenient to control the device.

Figure 5B:
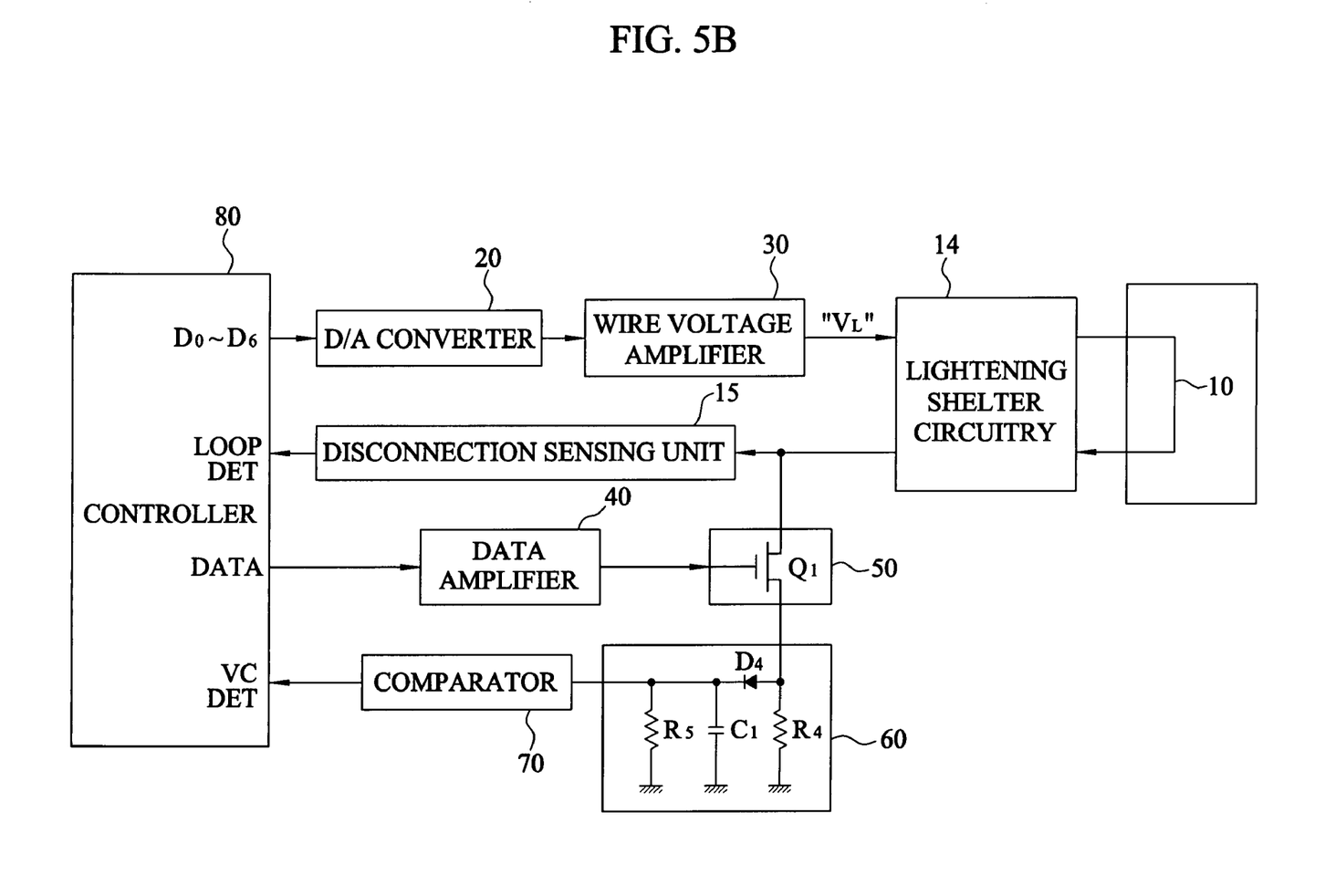
FIG. 5B is a block diagram showing a constitution of the fence wire transmitter according to the present invention.

FIG. 5B is a block diagram showing a constitution of the fence wire transmitter according to the present invention.

The electronic fence wire transmitter is comprised of: a fence wire 10 buried in a yard along the boundary of a confined area within which a pet may move around freely; a digital-analog (D/A) converter 20 for gradually increasing the voltage applied to the fence wire 10; a wire voltage amplifier 30 for amplifying voltage outputted from the D/A converter 20 and for applying to the fence wire 10; a data amplifier 40 for amplifying data signal that is applied to the fence wire 10 from a controller 80; a power amplifier 50 for power-amplifying a data signal that is outputted from the data amplifier 40; a voltage detector 60 that is connected in series to the fence wire 10; a comparator 70 for comparing the detected voltage of the voltage detector 60 with a reference voltage; and a controller 80 by which the D/A converter 20 is controlled according to a signal inputted from the comparator 70 and a voltage applied to the fence wire 10 increasing gradually until a value of the detected voltage is larger than the value of the reference voltage.

When power is applied, the D/A converter 20 divides $V_{cc}$ (5V) voltage into 128 steps according to a value of the data that is outputted from the data terminal $D_0$~$D_6$ of the controller 80. The step increases one by one and the voltage corresponding to the step is applied to the fence wire 10. A 7 bit binary data "1111111" is equivalent to $V_{cc}$=5V, and a "0000000" is equivalent to 0V. An output voltage of the D/A converter 20 gradually increases according to an increase of the data that is outputted from the data terminal $D_0$~$D_6$.

The wire voltage amplifier 30 amplifies at the demanded voltage value that is outputted from the D/A converter 20. The amplified voltage is also applied to the fence wire 10. Since the VC is divided into 128 steps by the D/A converter 20, the outputting voltage cannot exceed the maximum voltage of 5V.

However, a boundary length of the confined area 'S' can be variably changed in proportion to the area of the yard. The length of the fence wire 10 can change according to the length of the boundary. As the length of the fence wire is longer, its resistance increases, and the radio signal intensity that is emitted from the fence wire 10 decreases.

Therefore, when a length of the fence wire 10 become long, the voltage that is applied to the fence wire 10 must increase so as to increase the intensity of the radio signal. The wire voltage amplifier 30 has an amplifying ratio of 5~6 times.

Figure 6:
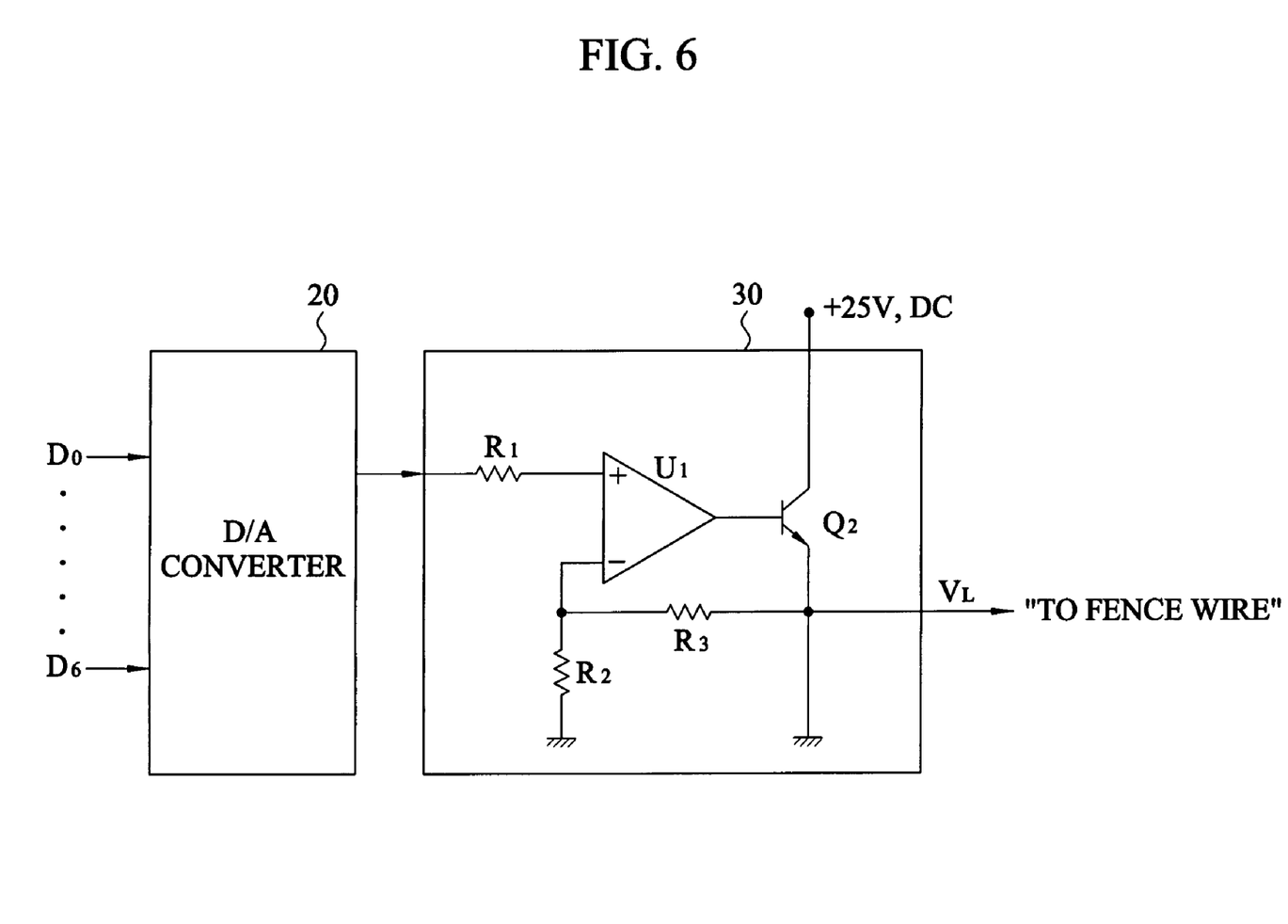
FIG. 6 is a schematic diagram showing the wire voltage amplifier of the electronic fence transmitter.

FIG. 6 is a schematic diagram showing the wire voltage amplifier of the electronic fence transmitter.

The wire voltage amplifier 30 is comprised of a non reverse amplifier $U_1$ that amplifies a voltage outputted from the D/A converter 20, a transistor $Q_2$ working as a current buffer and three resistors $R_1$, $R_2$, $R_3$.

Amplification degree is determined by a resistor ratio of $R_2$ to $R_3$. For instance, if resistors $R_2$=1.5 kΩ and $R_3$=10 kΩ are used then the amplification ratio is 6.7 (that is, $R_2/R_3$=10/1.5).

Therefore, when a maximum voltage of 5V is outputted from the D/A converter 20, the voltage applied to the fence wire 10 is 33.5V (that is, 6.7×5V).

The voltage amplified by the wire voltage amplifier 30 is applied to one end of the fence wire 10, and another end of the fence wire is connected to LOOP-DET terminal of the controller 80 through the disconnection sensing unit 15 (FIG. 5B).

Since the fence wire 10 must have a high current (ex. 1A), the current buffer transistor $Q_2$ amplifies the current of the applied voltage and then the amplified current is applied to the fence wire 10.

The disconnection sensing unit 15 and the data amplifier 40 are connected to the controller 80. The data amplifier 40 amplifies the data signal that is applied to the controller 80.

The signal applied to the fence wire 10 from the controller 80 consists of a 10 kHz pulse signal for example, and includes an identification number, a shock level, and mode selection data.

The power amplifier 50 becomes "ON" status by the pulse signal while the 10 kHz pulse signal is outputted. Thus, the power amplifier 50 is connected to a ground through the voltage detector 60. The power amplifier 50 reacts to the pulse signal, and the data signal is applied to the fence wire 10.

Figure 7:
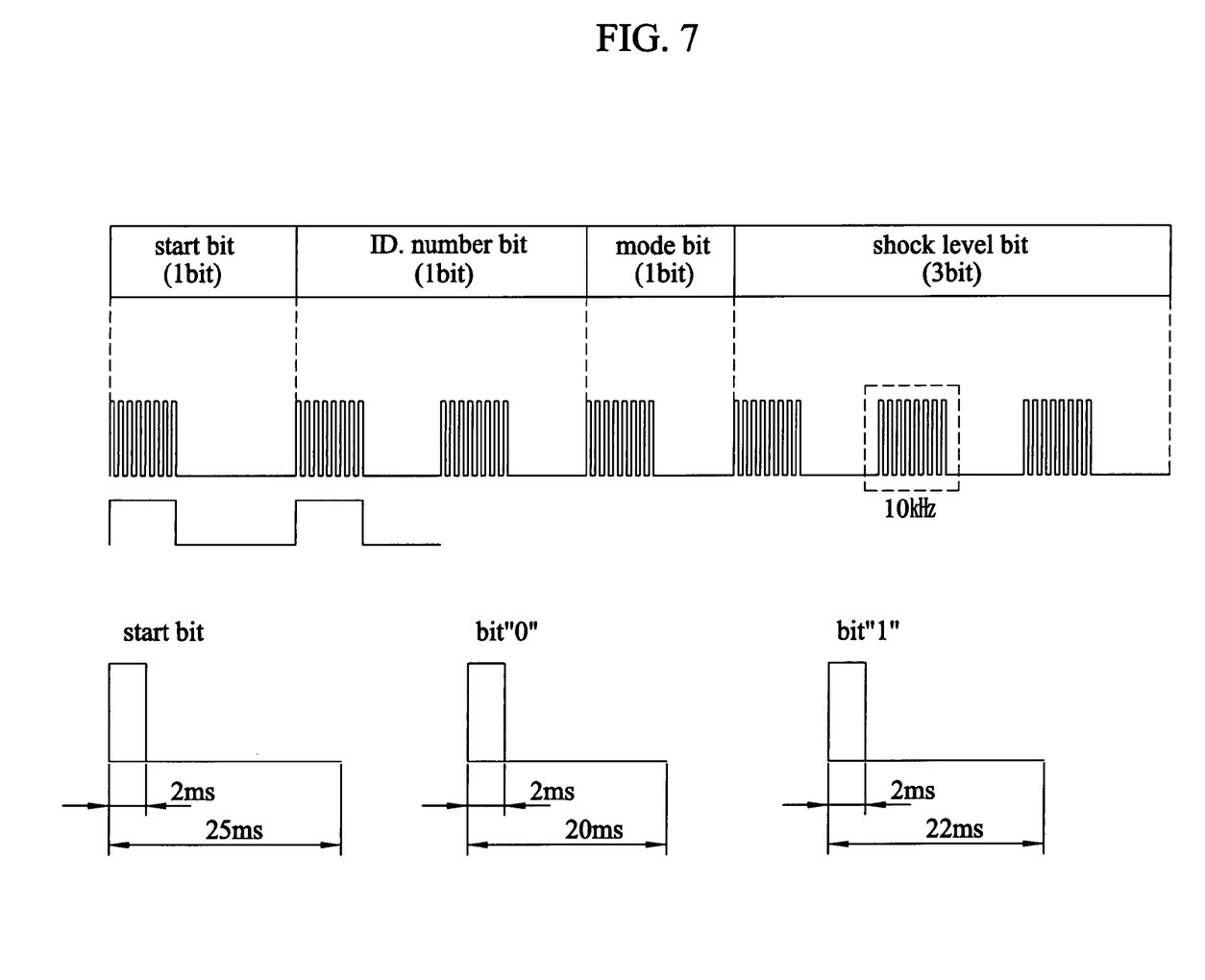
FIG. 7 is a format of data included in the radio signal applied to the fence wire by a transmitter according to the present invention.

FIG. 7 illustrates a format of data included in the radio signal applied to the fence wire by a transmitter according to the present invention.

The signal applied to the fence wire from the transmitter controller 80 is amplitude-modulated with a 10 kHz signal, and includes an identification number, a shock level, and mode selection data. The format of the signal contains an identification number bit, a mode level bit, and a shock level bit that are radiated in order.

A start bit generates a 10 kHz signal for 2 ms, and outputs a data signal after the lapse of 23 ms, thus showing a start bit. A data signal representing "0" generates a 10 kHz signal for 2 ms. A data signal outputs again after the lapse of 18 ms, and a data signal representing "1" generates a 10 kHz signal for 2 ms. A data signal outputs again after the lapse of 20 ms.

The power amplifier 50 (FIG. 5B) consists of a field-effect transistor $Q_1$, a gate lead which is connected to the data amplifier 40, a drain lead that is connected to one end of the fence wire 10, and a source lead that is connected to the voltage amplifier 60.

Therefore, when a 10 kHz pulse signal is applied to the gate of the FET $Q_1$, the FET is switched to "ON" state and connects one end of the fence wire 10 to a ground through a resistor $R_4$ of the voltage detector 60.

Figure 8:
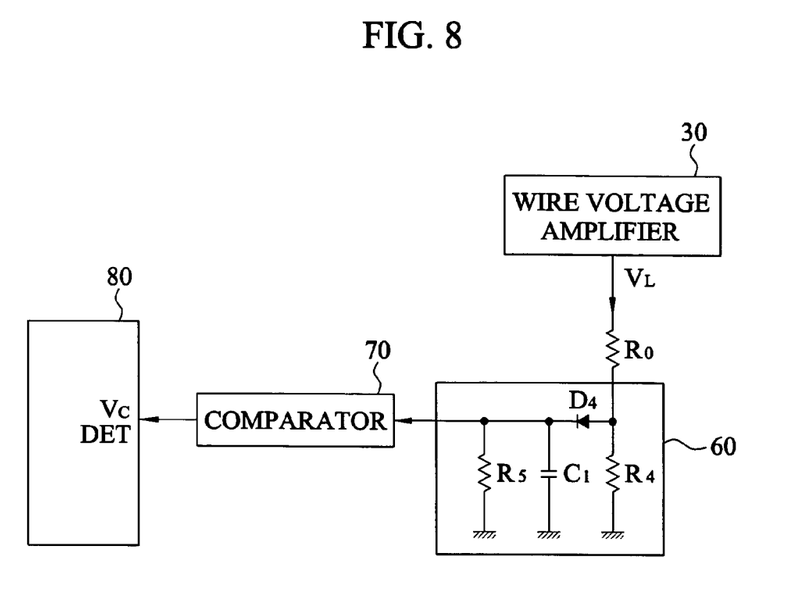
FIG. 8 is a circuit diagram showing a voltage detect resistor in respect with a fence wire being equivalent to resistor when a pulse signal is applied to a fence wire.

While the pulse signal is outputted from the data amplifier 40, the power amplifier 50 is on the active state, and the fence wire 10 can be equivalent to the resistor $R_0$ (FIG. 8). Therefore, resistors $R_0$, $R_4$ are connected in series during the output of the pulse signal. The voltage $V_L$ of the wire voltage amplifier 30 is applied to the equivalent resistance circuit, which shows in FIG. 8 as an equivalent circuit.

Similar to the above method, the fence wire can be equivalent to resistor $R_0$. The value of the resistor $R_0$ is in proportion to a length of the fence wire 10. If the fence wire adopts #18 AWG (America Wire Gauge) as its size, then the resistance of the wire is approximately 41.7Ω when the length of the fence wire 10 is 6,000 ft, and 13.9Ω when the length is 2,000 ft.

As the length of the fence wire becomes long, the resistance increases, and the intensity of the radio signal emitted from the fence wire decreases.

To solve the problem imposed by a longer fence wire increasing the resistance, in the present invention, the voltage detect resistor $R_4$ is connected to one end of the fence wire 10 and the voltage generated at the voltage detect resistor $R_4$ is detected.

The detected voltage is compared with the reference voltage $V_{ref}$ at the comparator 70. The value of comparison is entered into the controller 80 so that the output voltage of the D/A converter 20 increases until the detected voltage is the same as the reference voltage, which changes the voltage applied to the fence wire 10.

DC voltage is detected through the diode $D_4$ and the capacitor $C_1$ so as to apply the voltage generated from the voltage detect resistor $R_4$ to the comparator 70. The capacitor $C_1$ is maintained during a predetermined time until the detected voltage is compared with the reference voltage $V_{ref}$ at the comparator 70. After finishing the comparison, the resistor $R_5$ discharges the capacitor $C_1$.

To determine the reference voltage, when the receiving distance of the radio signal is 5 meters at the fence wire of which the length is 2,000 ft, the voltage applied to the resistor $R_4$ of the voltage detector 60 is measured and the measured voltage is established as the reference voltage of the comparator 70.

Figure 9:
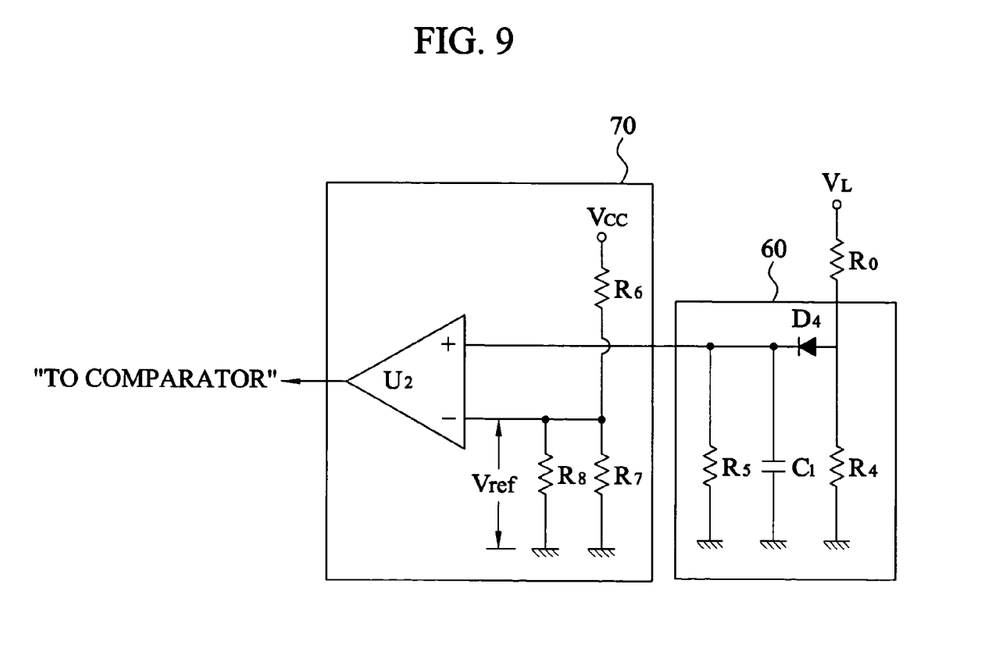
FIG. 9 is a circuit diagram of a comparator according to the present invention.

FIG. 9 shows a circuit diagram of a comparator according to the present invention.

The comparator 70 is comprised of an operational amplifier $U_2$, and three resistors $R_6$, $R_7$, and $R_8$ that apply a reference voltage $V_{ref}$ to a reverse terminal (−) of the operational amplifier $U_2$.

As shown in FIG. 9, the resistors $R_6$ and $R_7$ are connected in series to the $V_{cc}$ source, and the resistors $R_7$ is connected in parallel to $R_8$, while the end of the circuit is connected to the reverse terminal (−) of the operational amplifier $U_2$. Thus, voltage values that are divided on each end of the parallel resistors $R_7$ and $R_8$ are the same as that of the reference voltage $V_{ref}$. Further, the voltage detected at the voltage detector 60 is applied to the non reverse terminal (+) of the operational amplifier $U_2$.

In this state, the comparator 70 compares the reference voltage value $V_{ref}$ with the voltage value that is detected at the voltage detector 60. If the detected voltage value is less than the reference voltage value $V_{ref}$, the low signal goes to the controller 80.

The controller 80 controls the D/A converter 20 with the low signal; the output voltage value from the D/A converter 20 raises one step. The output voltage value from the D/A converter 20 is dependent on the binary data that are outputted from the data terminals of the controller 80 (FIG. 5B).

For example, when a binary data "0000110" (decimal "6") is outputted from the data terminals $D_0$~$D_6$ of the controller 80 and the output voltage value of the D/A converter 20 is 6×(5/128)V. The controller 80 outputs a binary data "0000111" (decimal "7") and the output voltage value from the D/A converter 20 is 7×(5/128)V.

In this manner, the output voltage value from the D/A converter 20 increases (5/128)V=0.039V one by one, and the voltage value is amplified 6.7 times at the wire voltage amplifier 30.

Figure 10:
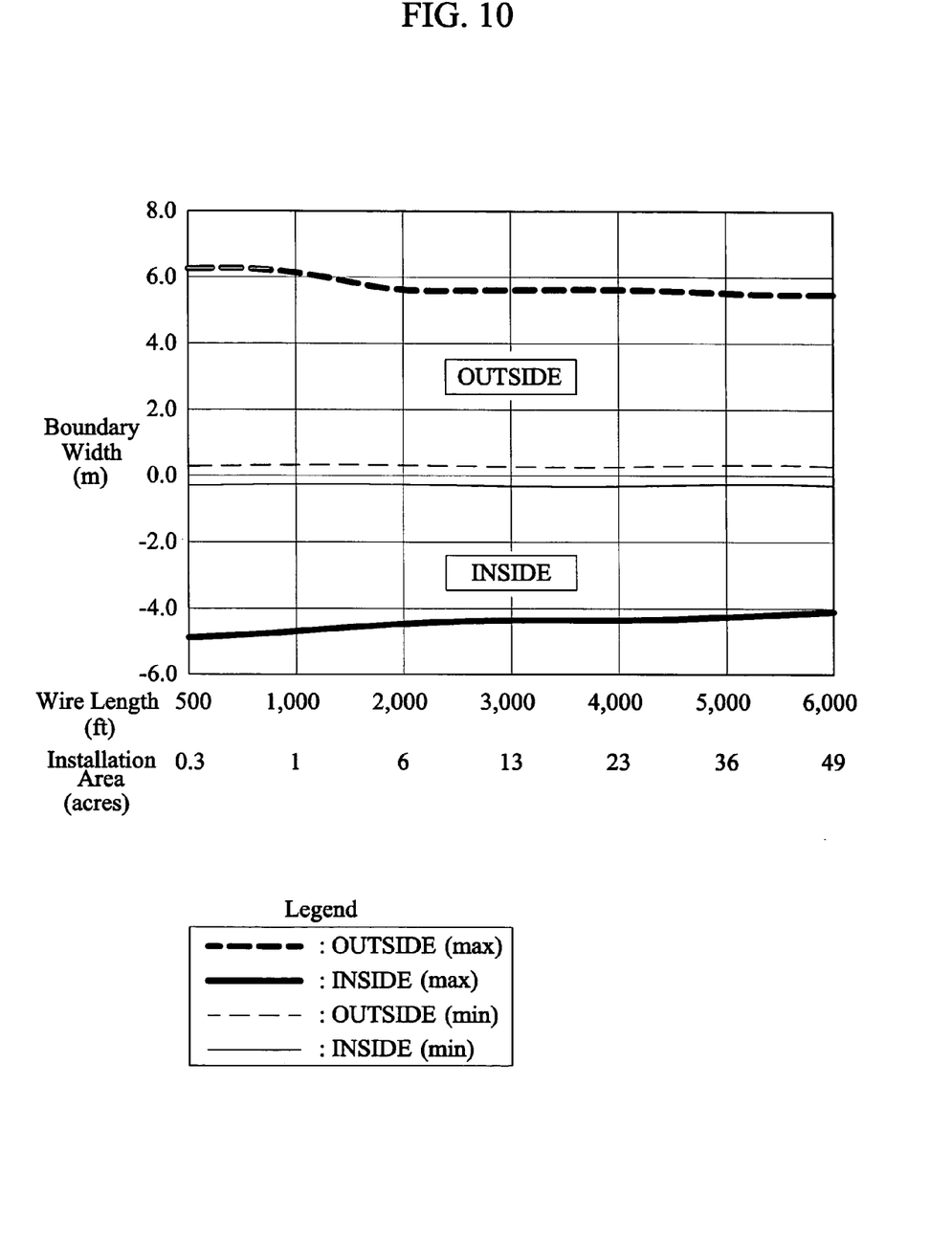
FIG. 10 is a graph in which a distance for receiving a radio signal is shown along the installation length of the fence wire when the inventive transmitter applies the radio signal to #18 AWG fence wire.

FIG. 10 illustrates a graph in which a distance for receiving a radio signal is shown along the installation length of the fence wire when the inventive transmitter applies the radio signal to #18 AWG fence wire.

Herein, the dotted lines indicate the receiving distance from the inside of the fence wire and the solid lines represent the receiving distance from the outside of the fence wire. The bold, dotted and solid lines represent the receiving distances at each direction when a maximum voltage is applied to the fence wire while the fine dotted and solid lines are the receiving distances at each direction when a minimum voltage is applied to the fence wire.

The resistance is approximately 13.9Ω when a length of the fence wire 10 is 2,000 ft. As the output voltage to the fence wire 10 from the wire voltage amplifier 30 is 8.6V, the receiving distance of the receiver 200 is approximately 4.3 meters in an inward direction and approximately 5.5 m in an outward direction from the fence wire 10. Using an equivalent circuit of FIG. 8, the voltage applied to the voltage detecting resistor $R_4$ (e.g. 1Ω) is obtained.

$$8.6V \times R_4/(R_0+R_4)=8.6V \times 1/(13.9+1)=0.578V$$

The voltage is established as the reference voltage $V_{ref}$ of the comparator 70. The resistance is approximately 27.89Ω when a length of the fence wire 10 is 4,000 ft. If the voltage applied to the voltage detecting resistor $R_4$ (e.g. 1Ω) is the same as the reference voltage of 0.578V, then the voltage applied to the fence wire 10 is obtained as follows:

0.578V×(27.8+1)/1=16.646V

The controller 80 controls the D/A converter 20 so that the voltage $V_L$ applied to the fence wire 10 from the wire voltage amplifier 30 increases gradually. When the voltage reaches 16.646V, the receiver 200 receives the radio signal at approximately 4.3 meters in an inward direction and at approximately 5.5 meters in an outward direction from the fence wire 10.

Similarly, the resistance is approximately 41.7Ω when a length of the fence wire 10 is 6,000 ft. The voltage applied to the fence wire 10 is obtained as follows:

0.578V×(41.7+1)/1=24.68V

The controller 80 controls the D/A converter 20 so that the detected voltage of the voltage detector 60 is 0.578V, and the voltage of 24.68V is applied to the fence wire 10 from the wire voltage amplifier 30. As shown in FIG. 10, the receiver 200 receives the radio signal at approximately 4.2 meters in an inward direction and at approximately 5.5 meters in an outward direction from the fence wire 10.

When the voltage detecting resistor $R_4$ of the voltage detector 60 is 1Ω, and the reference voltage is established as shown in above by the resistors $R_6$, $R_7$, and $R_8$ of the comparator 70, the receiver 200 receives the radio signal at approximately 4.2 meters in an inward direction and at approximately 5.5 meters in an outward direction from the fence wire 10.

To increase or decrease the receiving distance, the reference voltage of the comparator 70 can be varied above or under 0.578V. As one way of the variable method in the reference voltage $V_{ref}$, a variable resistor VR can be employed instead of resistors of the comparator 70.

When the voltage detecting resistor $R_4$ is substituted as a variable resistor, the user can vary the value of the voltage detecting resistor $R_4$ so that the voltage applied to the fence wire 10 can be changed. Thus, the receiving distance of the receiver 200 can increase or decrease.

The best way to increase or decrease the receiving distance is by changing the voltage applied to the fence wire 10.

Figure 11:
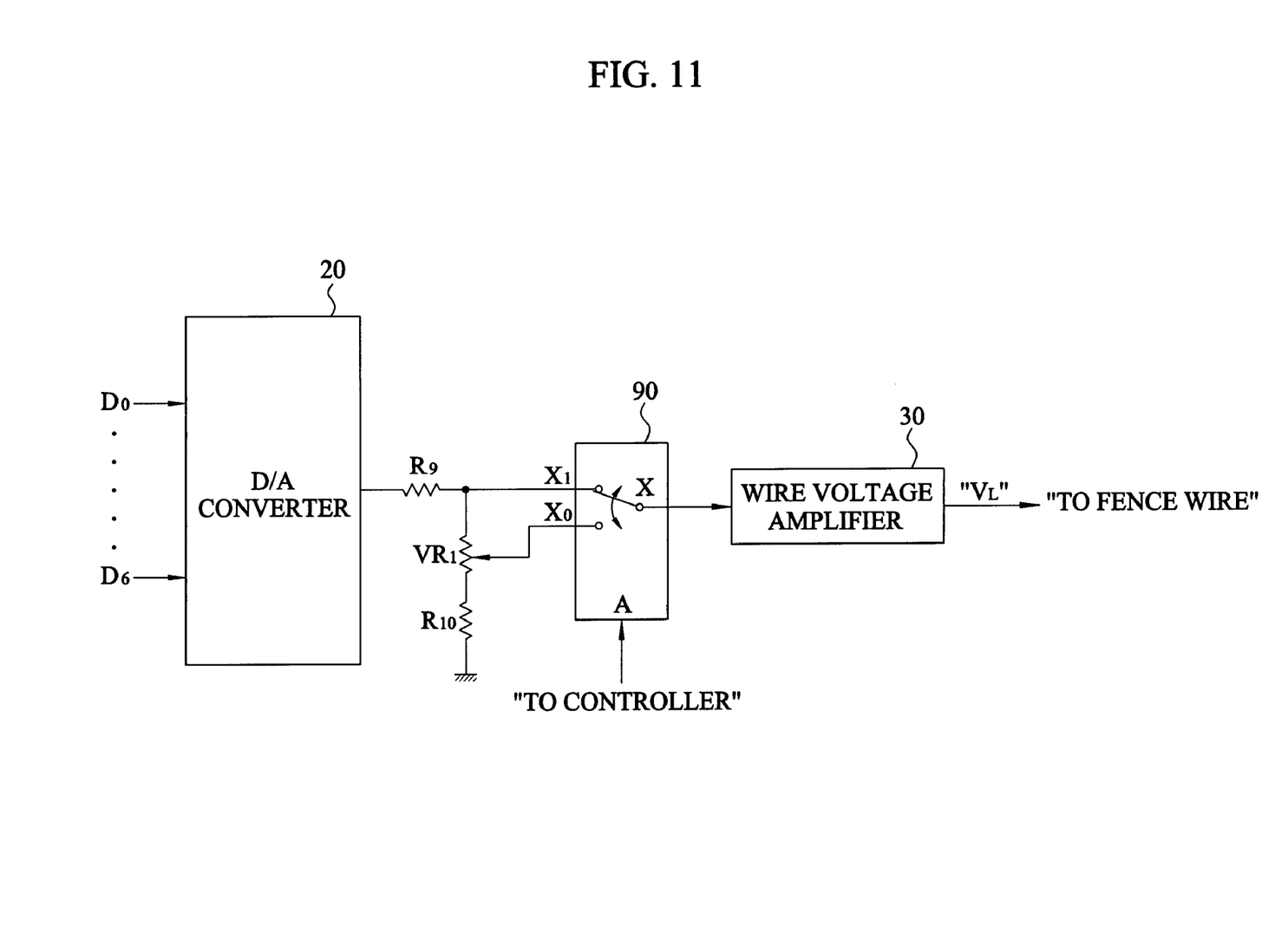
FIG. 11 is an embodiment for varying the voltage applied to the wire fence.

FIG. 11 illustrates an embodiment for varying the voltage applied to the wire fence.

A variable resistor $VR_1$ and an analog switch 90 are connected between the D/A converter 20 and the wire voltage amplifier 30 so as to manually vary the voltage $V_L$ that is applied to the fence wire 10. When the power is "ON", the controller 80 sends a "high" signal to an 'A' terminal of the analog switch 90 so that an '$X_1$' terminal is connected to an 'X' terminal.

Thus, a value of the variable resistor is the maximum. The output voltage of the D/A converter 20 increases gradually and the detected voltage applied to the voltage detecting resistor $R_4$ is the same as or slightly greater than the reference voltage $V_{ref}$. At this time, the output voltage of the D/A converter 20 is fixed.

When the detected voltage is the same as the reference voltage $V_{ref}$, the controller '80' sends the "low" signal to the 'A' terminal of the analog switch 90 so that an '$X_0$' terminal is connected to an 'X' terminal. Therefore, the variable resistor $VR_1$ is at the maximum and the output voltage of the D/A converter 20 is applied to the wire voltage amplifier 30 through the analog switch 90.

At this time, the receiver 200 approaches the fence wire 10 within 5 meters in an inward direction or in an outward direction and receives the data signal. When the receiving distance wants to be decreased, the variable resistor $VR_1$ can be controlled to decrease the value of the resistance. The voltage applied to the wire voltage amplifier 30 decreases and thus the receiving distance can decrease.

When the receiving distance is increased, a value of the variable resistor must be increased. However, the detected voltage that is the same as the reference voltage $V_{ref}$ is detected when a value of the resistance is the maximum. Thus, a higher voltage than the reference voltage cannot be applied.

The voltage detecting resistor $R_4$ is changed to a lower value of resistance, and the detected voltage lowers below the reference voltage $V_{ref}$. The "low" signal is sent to the controller 80 from the comparator 70. The controller 80 increases the output voltage of the D/A converter 20 so that the voltage applied to the fence wire 10 increases. The intensity of the data signal emitted from the fence wire 10 increases and the receiving distance increases.

In the same manner, when the reference voltage $V_{ref}$ is varied to the lower value, the voltage applied to the fence wire 10 increases by the same operation as the above explanation. As one example of a variability of the reference voltage $V_{ref}$, a variable resistor is inserted in a resistive circuit in which the reference voltage $V_{ref}$ is applied, and the resistance can be changed.

According to the present invention, the applied voltage can change as the length of the fence wire varies. The receiving distance, in which the receiver can receive a radio signal emitted from the fence wire, can be maintained.

Furthermore, since the voltage, which is applied to the fence wire from the transmitter, can automatically adjust, inconvenience can be avoided in order that the user does not have to manually adjust the applied voltage, and replace any wires. At the same time, it can avoid additional preparation such as variable resistors that can adjust to the applied voltage and a corresponding wire for a change in distance.

As a result, the emitted signal can receive signals within a predetermined distance regardless of whether the length of the fence is longer and the area enclosed is larger. Thus a pet's activity area can be enlarged, and it has the advantage that everyone can utilize the device with simple operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electronic fence transmitter for self-adjusting the receiving distance comprising:

a fence wire buried in a yard along the boundary of a confined area within which a pet may move around freely;

a digital-analog (D/A) converter for gradually increasing the voltage applied to the fence wire;

a wire voltage amplifier for amplifying voltage outputted from the D/A converter and for applying to the fence wire;

a data amplifier for amplifying data signal that is applied to the fence wire from a controller;

a power amplifier for power-amplifying a data signal that is outputted from the data amplifier;

a voltage detector that is connected in series to the fence wire;

a comparator for comparing the detected voltage of the voltage detector with a reference voltage; and a controller by which the D/A converter is controlled according to a signal inputted from the comparator and a voltage applied to the fence wire increasing gradually until a value of the detected voltage is larger than the value of the reference voltage.

2. The electronic fence transmitter according to claim 1, in which the signal applied to the fence wire from the transmitter controller is amplitude-modulated with a 10 kHz signal.

3. The electronic fence transmitter according to claim 1, in which the power amplifier consists of a field-effect transistor.

4. The electronic fence transmitter according to claim 1, in which the voltage detector is comprised of a resistor one end of which is connected to the power amplifier, another end of which is connected to a ground, and the resistor is connected to the fence wire so as to divide the voltage according to the ON operation of the power amplifier.

5. The electronic fence transmitter according to claim 4, in which when radio signal emitted from the fence wire having the predetermined length is received at the predetermined distance far from the fence wire, the voltage applied to the resistor of the voltage detector is measured and, the measured voltage is established as the reference voltage of the comparator.

6. The electronic fence transmitter according to claim 1, in which a variable resistor and an analog switch are connected between the D/A converter and the wire voltage amplifier so as to manually vary the voltage that is applied to the fence wire.

* * * * *